United States Patent
Malhotra et al.

(10) Patent No.: US 11,212,699 B1
(45) Date of Patent: Dec. 28, 2021

(54) WIRELESS GUARANTEED BIT RATE (GBR) DATA SERVICE

(71) Applicant: T-MOBILE INNOVATIONS LLC, Overland Park, KS (US)

(72) Inventors: Rajil Malhotra, Olathe, KS (US); Naresh Madineni, Overland Park, KS (US); Deveshkumar Narendrapratap Rai, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 16/911,167

(22) Filed: Jun. 24, 2020

(51) Int. Cl.
| | |
|---|---|
| G01R 31/08 | (2020.01) |
| H04W 28/02 | (2009.01) |
| H04W 36/14 | (2009.01) |
| H04W 48/18 | (2009.01) |
| H04W 8/08 | (2009.01) |
| H04W 88/06 | (2009.01) |
| H04W 36/00 | (2009.01) |

(52) U.S. Cl.
CPC ......... *H04W 28/0268* (2013.01); *H04W 8/08* (2013.01); *H04W 36/0022* (2013.01); *H04W 36/14* (2013.01); *H04W 48/18* (2013.01); *H04W 88/06* (2013.01)

(58) Field of Classification Search
CPC ......... H04W 28/0268; H04W 28/0273; H04W 28/0257; H04W 8/08; H04W 8/082; H04W 36/0022; H04W 36/0027; H04W 28/10; H04W 28/12; H04W 28/14; H04W 28/16; H04W 28/18; H04W 28/20; H04W 28/22; H04W 28/24; H04W 28/26; H04W 36/14; H04W 36/16; H04W 36/165; H04W 48/18; H04W 88/06
USPC ........................................................ 370/233
See application file for complete search history.

(56) References Cited

U.S. PATENT DOCUMENTS

| | | | |
|---|---|---|---|
| 10,334,485 | B2 | 6/2019 | Chandramouli et al. |
| 10,477,438 | B2 | 11/2019 | Huang-Fu et al. |
| 10,524,166 | B2 | 12/2019 | Youn et al. |
| 10,555,134 | B2 | 2/2020 | Shaw et al. |
| 10,567,943 | B2 | 2/2020 | Edge |
| 2017/0111512 | A1 | 4/2017 | Reddy Kothakapu et al. |
| 2019/0098547 | A1 | 3/2019 | Chong et al. |
| 2019/0174003 | A1 | 6/2019 | Chandramouli et al. |
| 2019/0297538 | A1 | 9/2019 | Keller et al. |

(Continued)

FOREIGN PATENT DOCUMENTS

| | | |
|---|---|---|
| WO | 2017211289 A1 | 12/2017 |
| WO | 2018008980 A1 | 1/2018 |

*Primary Examiner* — Huy C Ho

(57) ABSTRACT

A wireless User Equipment (UE) attaches to a Fifth Generation New Radio (5GNR) gNodeB in a wireless communication network. The wireless communication network receives a Guaranteed Bit Rate (GBR) request for the UE. In the wireless communication network, a Policy Control Function (PCF) efficiently invokes an Access and Mobility Management Function (AMF) and a Session Management Function (SMF) to effectively serve the GBR request. The AMF signals the UE and the 5GNR gNodeB to initiate the GBR service over the Long Term Evolution eNodeB. The SMF signals a data gateway to initiate the GBR service with the LTE eNodeB. The UE attaches to the LTE eNodeB. The LTE eNodeB and the data gateway deliver the requested GBR service to the UE.

20 Claims, 8 Drawing Sheets

(56) References Cited

U.S. PATENT DOCUMENTS

2019/0357036 A1* 11/2019 Leung .................. H04W 88/08
2020/0015128 A1*  1/2020 Stojanovski ...... H04W 36/0022
2020/0084744 A1   3/2020 Youn et al.
2020/0187043 A1*  6/2020 Xin ....................... H04M 15/66

* cited by examiner

WIRELESS GUARANTEED BIT RATE (GBR) DATA SERVICE

TECHNICAL BACKGROUND

Wireless communication networks provide wireless data services to wireless user devices. Exemplary wireless data services include machine-control, internet-access, media-streaming, and social-networking. Exemplary wireless user devices comprise phones, computers, vehicles, robots, and sensors. The wireless communication networks have wireless access nodes that exchange wireless signals with the wireless user devices using wireless network protocols. Exemplary wireless network protocols include Institute of Electrical and Electronic Engineers (IEEE) 802.11 (WIFI), Long Term Evolution (LTE), Fifth Generation New Radio (5GNR), and Low-Power Wide Area Network (LP-WAN).

In some examples, multiple wireless access nodes serve the same wireless user device at the same time. For example, a wireless user device may use a 5GNR access node for internet access and an LTE access node for voice calling. While the data rate for the internet access may vary at best effort levels, the data rate for the voice communications should remain consistent at a guaranteed level that serves interactive human speech. The consistent data rate is referred to as a Guaranteed Bit Rate (GBR). There are GBRs for other wireless data services like video-conferencing and interactive gaming.

When a wireless user device attaches to a 5GNR access node for internet access, the wireless user device may then "fallback" to an LTE access node for voice-calling as needed. Unfortunately, the current GBR fallback from 5GNR to LTE requires extensive signaling to add the voice bearer in the LTE network. In particular, the fallback interactions between a Policy Control Function (PCF), Access and Mobility Management Function (AMF), and Session Management Function (SMF) are cumbersome. The fallback operations of the PCF, AMF, and SMF for other GBR services like video conferencing and interactive gaming also remains inefficient.

TECHNICAL OVERVIEW

A wireless User Equipment (UE) attaches to a Fifth Generation New Radio (5GNR) gNodeB in a wireless communication network. The wireless communication network receives a Guaranteed Bit Rate (GBR) request for the UE. In the wireless communication network, a Policy Control Function (PCF) efficiently invokes an Access and Mobility Management Function (AMF) and a Session Management Function (SMF) to effectively serve the GBR request. The AMF signals the UE and the 5GNR gNodeB to initiate the GBR service over the Long Term Evolution eNodeB. The SMF signals a data gateway to initiate the GBR service with the LTE eNodeB. The UE attaches to the LTE eNodeB. The LTE eNodeB and the data gateway deliver the requested GBR service to the UE.

DETAILED DESCRIPTION

Figure 1:
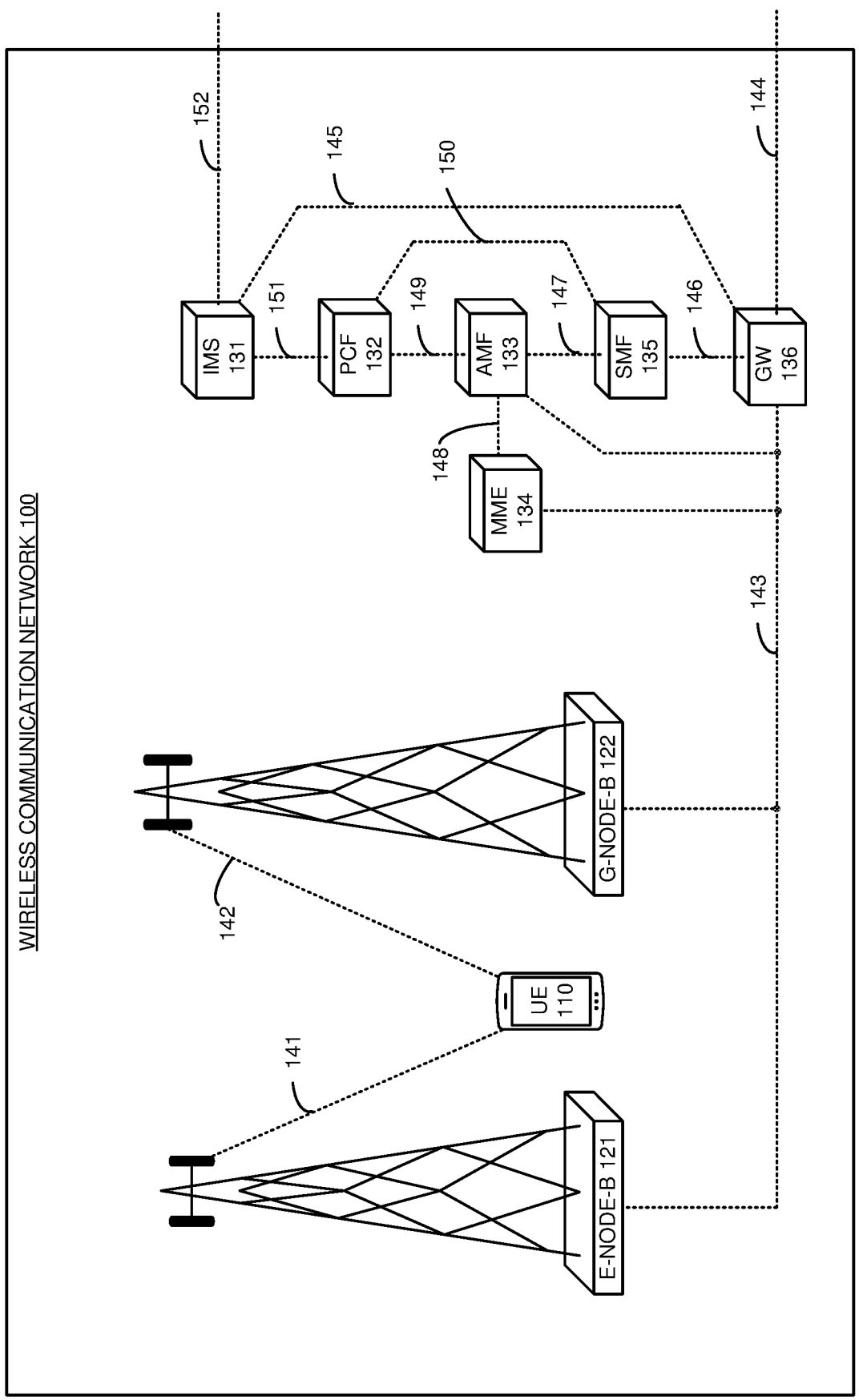
FIG. 1 illustrates a wireless communication network to serve a wireless User Equipment (UE) with a wireless Guaranteed Bit Rate (GBR) service.

FIG. 1 illustrates wireless communication network 100 to serve wireless User Equipment (UE) 110 with a wireless Guaranteed Bit Rate (GBR) service. The wireless GBR service comprises the "over-the-air" transmission of user data at a consistent bits-per-second level that corresponds to the GBR. The GBR service may comprise a voice-calling, video-calling, interactive-gaming, media-streaming, augmented-reality, machine-control, or some other wireless networking product. Wireless communication network 100 comprises wireless UE 110, eNodeB 121, gNodeB 122, Internet Protocol Multimedia Subsystem (IMS) 131, Policy Control Function (PCF) 132, Access and Mobility Function (AMF) 133, Mobility Management Entity (MME) 134, Session Management Function (SMF) 135, and data gateway (GW) 136. UE 110 wirelessly communicates with eNodeB 121 over Long Term Evolution (LTE) link 141. UE 110 wirelessly communicates with gNodeB 122 over Fifth Generation New Radio (5GNR) link 142. NodeBs 121-122 communicate with AMF 133, MME 134, and GW 136 over backhaul links 143. Data GW 136 communicates with external systems over data links 144 and with IMS 131 over IMS links 145. Data GW 136 and SMF 135 communicate over Fifth Generation Core (5GC) link 146. SMF 135 and AMF 133 communicate over 5GC link 147. AMF 133 and MME 134 communicate over 5GC link 148. AMF 133 and PCF 132 communicate over 5GC link 149. PCF 132 and SMF 135 communicate over 5GC link 150. PCF 132 and IMS 131 communicate over 5GC link 151. IMS 131 communicates with external systems over data links 152

Various examples of network operation and configuration are described herein. In one example, UE 110 wirelessly initially attaches to gNodeB 122. In response to the 5GNR attachment, gNodeB 122 transfers 5GC attachment signaling for UE 110 to AMF 133. AMF 133 authenticates and authorizes UE 110 for 5GNR services that may include an internet-access bearer over gNodeB 122 and GW 136. The 5GNR services also includes a Session Initiation Protocol (SIP) bearer to IMS 131 over gNodeB 122 and GW 136. AMF 133 transfers 5GC Radio Access Network (RAN) signaling to gNodeB 122 to implement the internet-access bearer and the SIP bearer. 5GNR gNodeB 122 transfers 5GNR UE signaling to UE 110 to implement the internet-access bearer and the SIP bearer. AMF 133 transfers 5GC SMF signaling to SMF 135 to implement the internet-access bearer and the SIP bearer. SMF 135 transfers 5GC GW signaling to GW 136 to implement the internet-access bearer and the SIP bearer. UE 110, gNodeB 122, and GW 136 implement the internet-access bearer and the SIP bearer. UE 110 registers with IMS 131 over the SIP bearer. UE 110 may access web sites over the internet-access bearer.

IMS 131 may receive a SIP request from UE 110 over the SIP bearer or from an external system over data links 152. After an exchange of network addressing and other information responsive to the SIP request, IMS 131 transfers a corresponding GBR service request for UE 110 to PCF 132. PCF 132 receives the GBR service request for UE 110 from IMS 131, and in response, transfers 5GC GBR signaling for UE 110 to AMF 133. AMF 133 receives the 5GC GBR signaling for UE 110 from PCF 132 and responsively determines if UE 110 qualifies for GBR fallback. UE 110 may qualify for GBR fallback when UE 110 is pre-designated in AMF 133 for GBR fallback. UE 110 may qualify for GBR fallback when UE 110 is not pre-designated in AMF 133 for Voice over New Radio (VoNR).

If UE 110 is qualified for GBR fallback, then AMF 133 transfers: 1) 5GNR RAN signaling for UE 110 to gNodeB 122, 2) PCF fallback signaling for UE 110 to PCF 132, and 3) LTE fallback signaling for UE 110 to MME 134. 5GNR gNodeB 122 receives the 5GNR RAN signaling from AMF 133 and responsively transfers 5GNR UE signaling to UE 110. PCF 132 receives the PCF fallback signaling from AMF 133 and responsively transfers SMF GBR signaling for UE 110 to SMF 135. MME 134 receives the LTE fallback signaling from AMF 133 and responsively transfers LTE RAN signaling for UE 110 to eNodeB 121.

UE 110 wirelessly attaches to eNodeB 121 responsive to the 5GNR UE signaling from gNodeB 122. In response to the wireless attachment of UE 110, LTE eNodeB 121 transfers LTE attachment signaling for UE 110 to MME 134. MME 134 receives the LTE attachment signaling from eNodeB 121 and responsively transfers GBR attachment signaling to AMF 133. AMF 133 receives the GBR attachment signaling from MME 134 and responsively transfers SMF fallback signaling for UE 110 to SMF 135. SMF 135 receives the SMF GBR signaling from PCF 132 and receives the SMF fallback signaling from AMF 133. In response to both the GBR signaling and the fallback signaling, SMF 135 transfers gateway GBR signaling for UE 110 to data gateway 136.

In response to the LTE RAN signaling from MME 134, LTE eNodeB 121 delivers the wireless GBR service to UE 110. Data gateway 136 receives the gateway GBR signaling from SMF 135 and responsively delivers the wireless GBR service to UE 110 over eNodeB 121. Thus, user data flows per the GBR between UE 110 and data links 144 over eNodeB 121 and GW 136. Advantageously, the fallback operations of PCF 132, AMF 133, and SMF 135 efficiently initiate GBR services like voice-calling, video-calling, interactive-gaming, media-streaming, augmented-reality, machine-control, or some other wireless networking product.

Wireless links 141-142 use electromagnetic frequencies in the low-band, mid-band, high-band, or some other portion of the electromagnetic spectrum. Data links 143-152 use metal, glass, air, or some other media. Data links 143-152 use IEEE 802.3 (Ethernet), Time Division Multiplex (TDM), Data Over Cable System Interface Specification (DOCSIS), Internet Protocol (IP), 5GC, 5GNR, LTE, WIFI, virtual switching, inter-processor communication, bus interfaces, and/or some other data communication protocols. Although UE 110 is depicted as a smartphone, UE 110 might instead comprise a computer, robot, vehicle, or some other data appliance with wireless communication circuitry. NodeBs 121-122 are depicted as towers, but NodeBs 121-122 may use other mounting structures or no mounting structure at all.

UE 110 and NodeBs 121-122 comprise antennas, amplifiers, filters, modulation, analog/digital interfaces, microprocessors, software, memories, transceivers, bus circuitry, and the like. Network elements 131-136 comprise microprocessors, memories, software, transceivers, bus circuitry, and the like. The microprocessors comprise Digital Signal Processors (DSP), Central Processing Units (CPU), Graphical Processing Units (GPU), Application-Specific Integrated Circuits (ASIC), and/or the like. The memories comprise Random Access Memory (RAM), flash circuitry, disk drives, and/or the like. The memories store software like operating systems, user applications, radio applications, and network applications. The microprocessors retrieve the software from the memories and execute the software to drive the operation of wireless communication network 100 as described herein.

Figure 2:
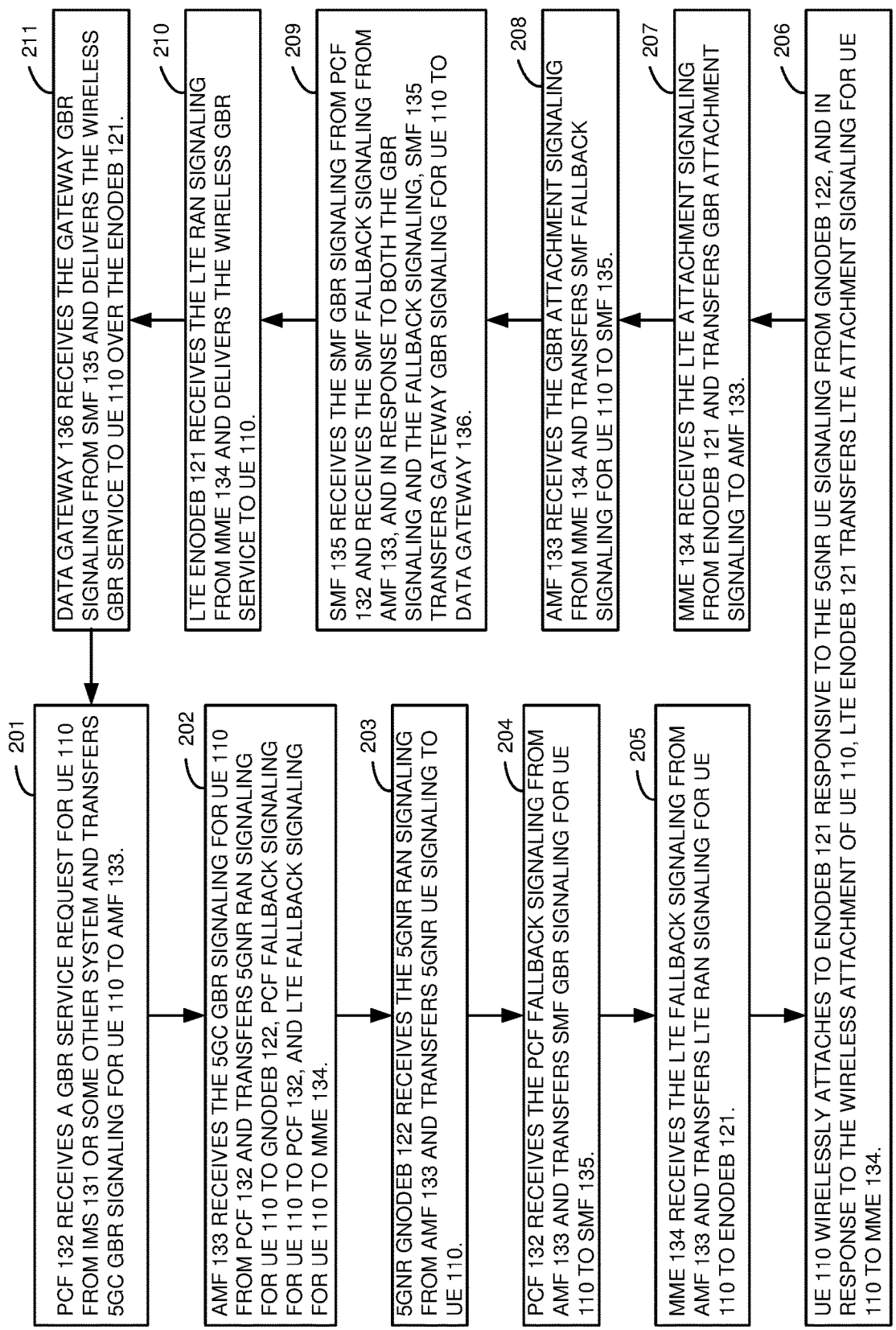
FIG. 2 illustrates an exemplary operation of the wireless communication network to serve the wireless UE with the wireless GBR service.

FIG. 2 illustrates an exemplary operation of wireless communication network 100 to serve wireless UE 110 with the wireless GBR service. PCF 132 receives a GBR service request for UE 110 from IMS 131 or some other system and transfers 5GC GBR signaling for UE 110 to AMF 133 (201). AMF 133 receives the 5GC GBR signaling for UE 110 from PCF 132 and transfers: 1) 5GNR RAN signaling for UE 110 to gNodeB 122, 2) PCF fallback signaling for UE 110 to PCF 132, and 3) LTE fallback signaling for UE 110 to MME 134 (202). 5GNR gNodeB 122 receives the 5GNR RAN signaling from AMF 133 and transfers 5GNR UE signaling to UE 110 (203). PCF 132 receives the PCF fallback signaling from AMF 133 and transfers SMF GBR signaling for UE 110 to SMF 135 (204). MME 134 receives the LTE fallback signaling from AMF 133 and transfers LTE RAN signaling for UE 110 to eNodeB 121 (205).

UE 110 wirelessly attaches to eNodeB 121 responsive to the 5GNR UE signaling from gNodeB 122, and in response to the wireless attachment of UE 110, LTE eNodeB 121 transfers LTE attachment signaling for UE 110 to MME 134 (206). MME 134 receives the LTE attachment signaling from eNodeB 121 and transfers GBR attachment signaling to AMF 133 (207). AMF 133 receives the GBR attachment signaling from MME 134 and transfers SMF fallback signaling for UE 110 to SMF 135 (208). SMF 135 receives the SMF GBR signaling from PCF 132 and receives the SMF fallback signaling from AMF 133, and in response to both the GBR signaling and the fallback signaling, SMF 135 transfers gateway GBR signaling for UE 110 to data gateway 136 (209). LTE eNodeB 121 receives the LTE RAN signaling from MME 134 and delivers the wireless GBR service to UE 110 (210). Data gateway 136 receives the gateway GBR signaling from SMF 135 and delivers the wireless GBR service to UE 110 over the eNodeB 121 (211). The operation repeats for subsequent GBR requests (201).

Figure 3:
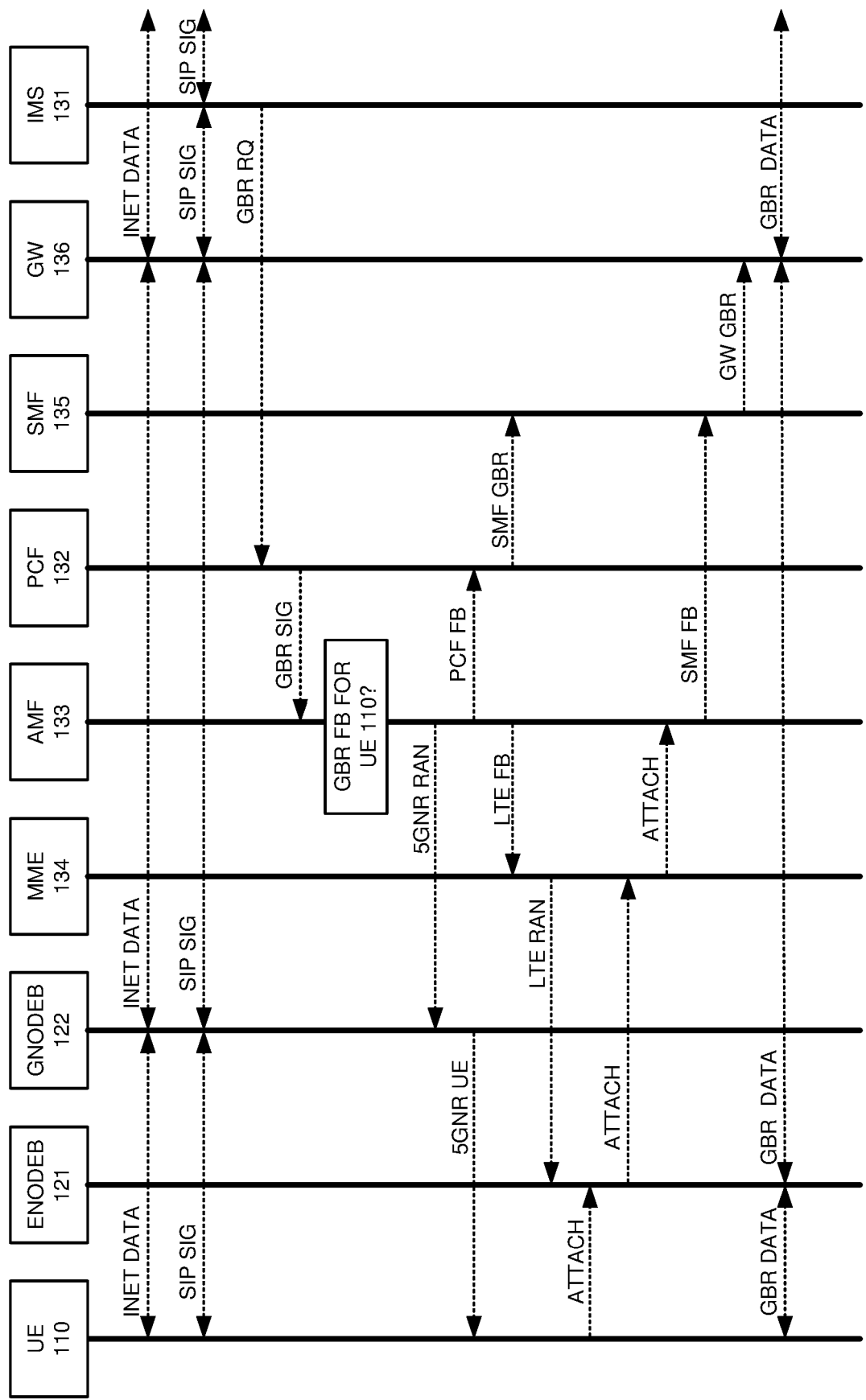
FIG. 3 illustrates an exemplary operation of the wireless communication network to serve the wireless UE with the wireless GBR service.

FIG. 3 illustrates an exemplary operation of wireless communication network 100 to serve wireless UE 110 with the wireless GBR service. UE 110 wirelessly exchanges internet (INET) data with gNodeB 122. 5GNR gNodeB 122 exchanges the internet data with GW 136, and GW 136 exchanges the internet data with the internet. UE 110 and IMS 131 exchange SIP signaling over a SIP bearer that traverses gNodeB 122 and GW 136. IMS 131 and an external system exchange SIP signaling (SIG). After an exchange of network addressing over the SIP signaling, IMS 131 transfers a corresponding GBR service request (RQ) for UE 110 to PCF 132. PCF 132 transfers 5GC GBR signaling for UE 110 to AMF 133. AMF 133 determines if UE 110 qualifies for GBR fallback. When UE 110 qualifies for GBR fallback, then AMF 133 transfers: 1) 5GNR RAN signaling for UE 110 to gNodeB 122, 2) PCF fallback (FB) signaling for UE 110 to PCF 132, and 3) LTE fallback signaling for UE 110 to MME 134. 5GNR gNodeB 122 receives the 5GNR RAN signaling from AMF 133 and responsively transfers 5GNR UE signaling to UE 110. PCF 132 receives the PCF fallback signaling from AMF 133 and responsively transfers SMF GBR signaling for UE 110 to SMF 135. MME 134 receives the LTE fallback signaling from AMF 133 and responsively transfers LTE RAN signaling for UE 110 to eNodeB 121.

UE 110 wirelessly attaches to eNodeB 121 responsive to the 5GNR UE signaling from gNodeB 122. In response to the wireless attachment of UE 110, LTE eNodeB 121 transfers LTE attachment signaling for UE 110 to MME 134. MME 134 receives the LTE attachment signaling from eNodeB 121 and responsively transfers GBR attachment signaling to AMF 133. AMF 133 receives the GBR attachment signaling from MME 134 and responsively transfers SMF fallback signaling for UE 110 to SMF 135. SMF 135 receives the SMF GBR signaling from PCF 132 and receives the SMF fallback signaling from AMF 133. In response to both the GBR signaling and the fallback signaling, SMF 135 transfers gateway GBR signaling for UE 110 to data gateway 136.

In response to the LTE RAN signaling from MME 134, LTE eNodeB 121 wirelessly exchanges GBR data with UE 110 and exchanges the GBR data with data GW 136. Data gateway 136 receives the gateway GBR signaling from SMF 135 and responsively exchanges the GBR data with eNodeB 121 and exchanges the GBR data with the external system. For example, voice data may flow per a voice-quality GBR between UE 110 and the external system over eNodeB 121 and data GW 136.

Figure 4:
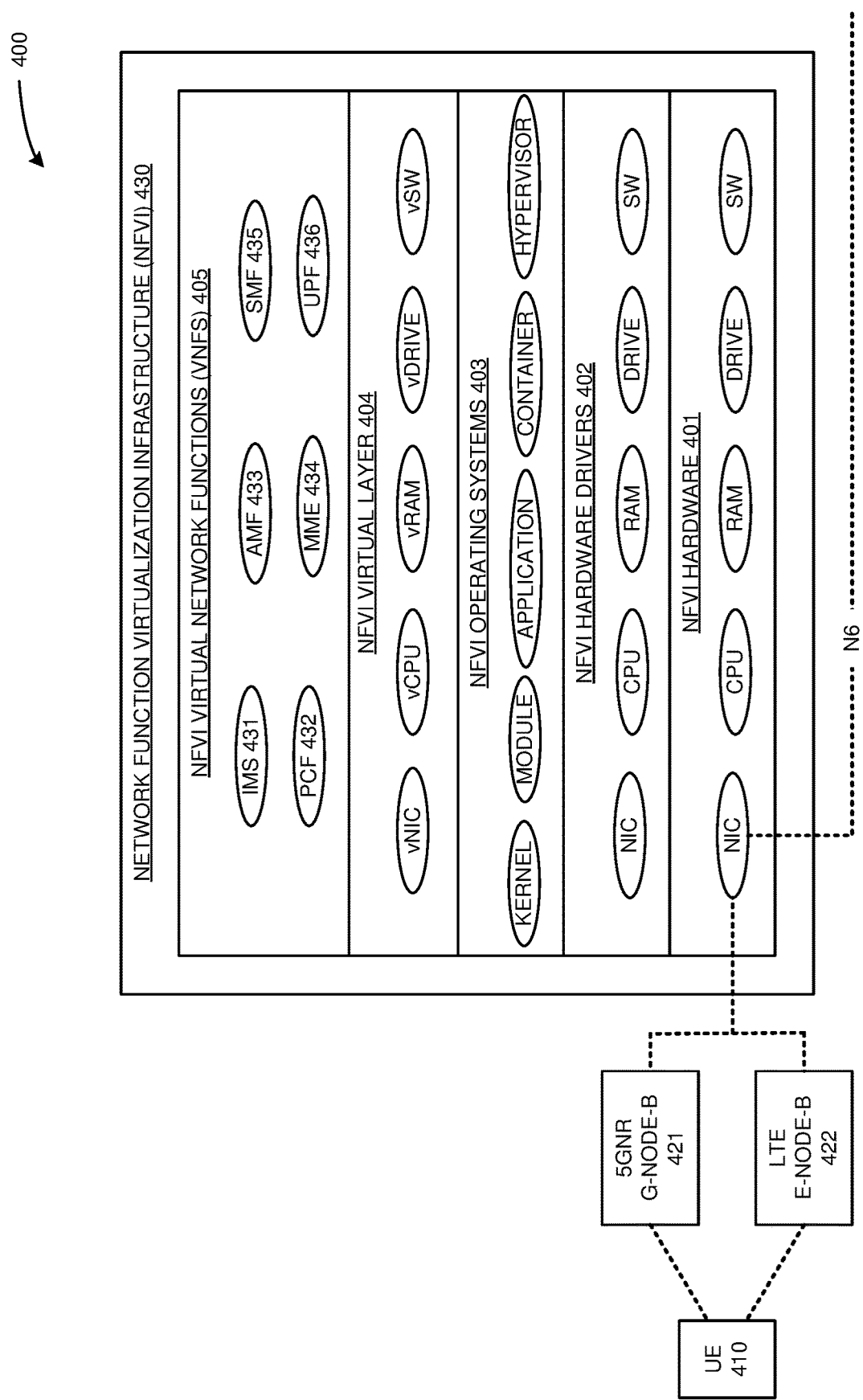
FIG. 4 illustrates a Network Function Virtualization Infrastructure (NFVI) to serve the wireless UE with a wireless voice service.

FIG. 4 illustrates Network Function Virtualization Infrastructure (NFVI) 430 to serve wireless UE 410 with a wireless voice-calling service in 5G/LTE network 400. 5G/LTE network 400 comprises UE 410, 5GNR gNodeB 421, LTE eNodeB 422, and NFVI 430. NFVI 430 is an example of network elements 131-136, although these network elements may differ. NFVI 430 could deliver other GBR services like augmented-reality, machine-control, and video-conferencing in a similar manner. NFVI 430 comprises NFVI hardware 401, NFVI hardware drivers 402, NFVI operating systems 403, NFVI virtual layer 404, and NFVI Virtual Network Functions (VNFs) 405.

NFVI hardware 401 comprises Network Interface Cards (NIC), CPU, RAM, flash/disk drives, and data switches (SW). NFVI hardware drivers 402 comprise software that is resident in the NIC, CPU, RAM, DRIVE, and SW. NFVI operating systems 403 comprises kernels, modules, applications, containers, hypervisors, and the like. NFVI virtual layer 404 comprises virtual NICs (vNIC), virtual CPUs (vCPU), virtual RAM (vRAM), virtual Drives (vDRIVE), and virtual Switches (vSW). NFVI VNFs 405 comprise IMS 431, PCF 432, AMF 433, MME 434, SMF 435, and UPF 436. Other LTE VNFs and 5GC VNFs are typically present but are omitted for clarity. IMS 431 comprises a Proxy Call State Control Function (P-CSCF), Serving-CSCF (S-CSCF), telephony servers, messaging servers, network interfaces, and the like. SMF 435 may comprise a System Architecture Evolution Gateway Control Plane (SAE GW-C). Data gateway 136 may comprises an SAE GW User Plane (SAE GW-U). The NIC are coupled to NodeBs 421-422 over backhaul links. The NIC are coupled to external systems over N6 links. NFVI hardware 401 executes NFVI hardware drivers 402, NFVI operating systems 403, NFVI virtual layer 404, and NFVI VNFs 405 to serve UEs 410 with the voice-calling service over the wireless links, NodeBs 421-422, backhaul links, NIC, and N6 links.

In operation, UE 410 wirelessly attaches to 5GNR gNodeB 421 over a wireless 5GNR link. In response to the 5GNR attachment, 5GNR gNodeB 421 transfers 5GC N2 signaling for UE 110 to 5GC AMF 433. AMF 433 authenticates and authorizes UE 410 for 5GNR services that include 5GNR internet-access and LTE voice-calling. AMF 433 transfers 5GC N2 signaling to 5GNR gNodeB 421 to implement an internet-access bearer and a Session Initiation Protocol (SIP) bearer. 5GNR gNodeB 122 transfers 5GNR Radio Resource Control (RRC) signaling to UE 410 to implement the internet-access bearer and the SIP bearer. AMF 433 transfers 5GC SMF signaling to SMF 135 to implement the internet-access bearer and the SIP bearer. SMF 135 transfers 5GC N4 signaling to UPF 436 to implement the internet-access bearer and the SIP bearer. UE 410, gNodeB 421, and UPF 436 implement the internet-access bearer and the SIP bearer. UE 410 registers with IMS 431 over the SIP bearer. UE 410 communicates with the internet over the internet-access bearer.

The S-CSCF in IMS 431 may receive a SIP request from UE 410 or from an external system. The S-CSCF in IMS 431 exchanges SIP signaling with UE 410 and the external system to invite, accept, and exchange addresses for the voice-call. To serve the voice call, the P-CSCF in IMS 431 transfers a corresponding voice bearer request for UE 410 to PCF 432. PCF 432 receives the voice bearer request for UE 410 from the P-CSCF in IMS 431, and in response, transfers 5GC AMF signaling for UE 410 to AMF 433. AMF 133 receives the 5GC AMF signaling for UE 410 from PCF 432 and responsively determines if UE 410 qualifies for LTE fallback by accessing a hosted data structure that correlates UEs with their fallback qualifications. When UE 410 is qualified for LTE fallback, AMF 433 transfers: 1) 5GNR N2 signaling for UE 410 to 5GNR gNodeB 421, 2) 5GC PCF signaling for UE 410 to PCF 432, and 3) 5GC N26 signaling for UE 410 to MME 434.

5GNR gNodeB 421 receives the 5GC N2 signaling from AMF 433 and responsively transfers 5GNR RRC signaling to UE 410. PCF 432 receives the PCF signaling from AMF 433 and responsively transfers SMF signaling for UE 410 to SMF 435. MME 434 receives the 5GC N26 signaling from AMF 433 and responsively transfers LTE S1-MME signaling for UE 410 to LTE eNodeB 422. UE 410 wirelessly attaches to LTE eNodeB 422 responsive to the 5GNR RRC signaling from 5GNR gNodeB 422. In response to the wireless attachment of UE 410, LTE eNodeB 422 transfers LTE S1-MME signaling for UE 410 to MME 434.

MME 134 receives the LTE S1-MME signaling from LTE eNodeB 422 and responsively transfers 5GC N26 signaling to AMF 133 indicating LTE attachment. AMF 133 receives the 5GC N26 signaling from MME 434 and responsively transfers SMF signaling for the voice bearer for UE 410 to SMF 435. SMF 435 receives the SMF signaling from PCF 132 and from AMF 133. In response to both, SMF 435 transfers 5GC N4 signaling for the voice bearer for UE 410 to UPF 436. UPF 436 receives the 5GC N4 signaling from SMF 435 and responsively delivers the voice bearer to UE 410. LTE eNodeB 422 receives the S1-MME signaling from MME 434 and responsively delivers the voice bearer to UE 410. Thus, voice data flows per a voice-quality GBR between UE 410 and the N6 links over LTE eNodeB 422 and UPF 436.

Figure 5:
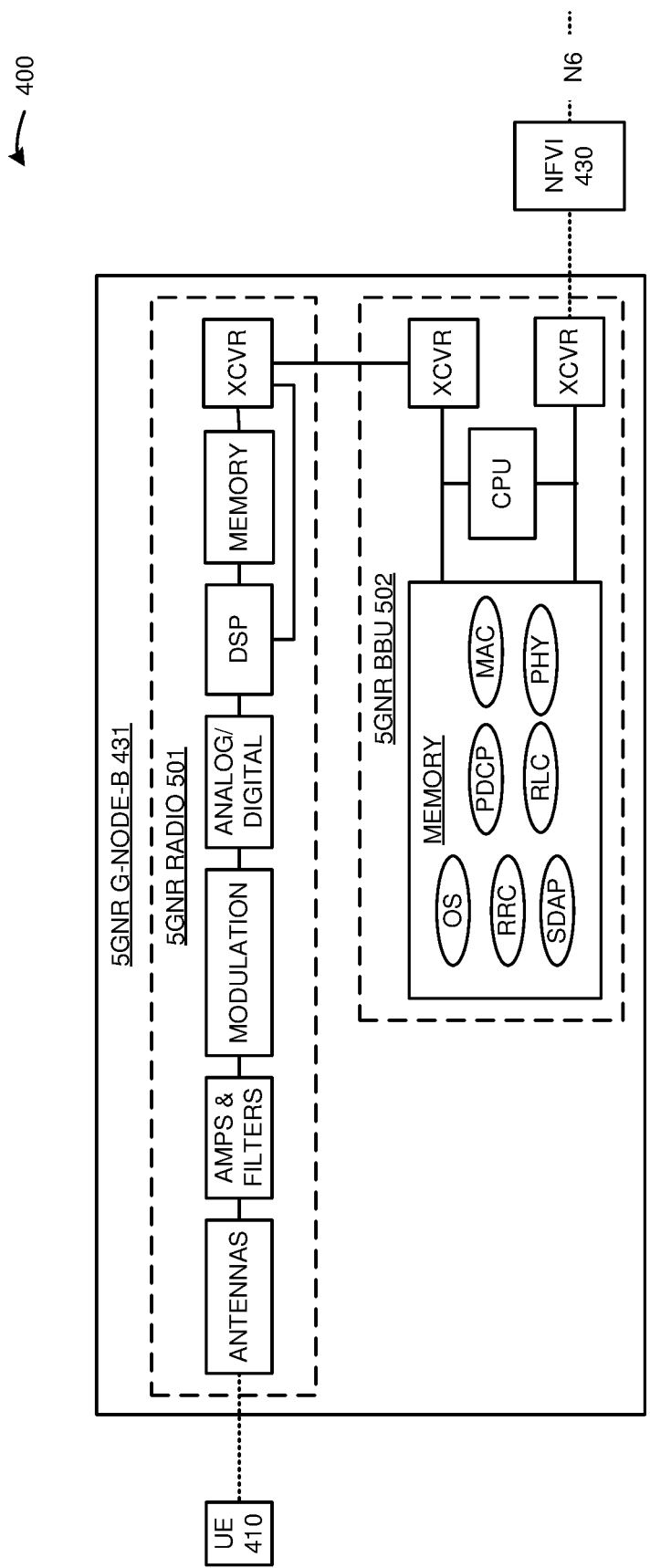
FIG. 5 illustrates a Fifth Generation New Radio (5GNR) gNodeB to serve the wireless UE with the wireless voice service.

FIG. 5 illustrates Fifth Generation New Radio (5GNR) gNodeB 421 to serve wireless UE 410 with the wireless voice-calling service. 5GNR gNodeB 421 is an example of gNodeB 122, although gNodeB 122 may differ. 5GNR gNodeB 421 comprises 5GNR radio 501 and 5GNR BBU 502. 5GNR radio 501 comprises antennas, amplifiers, filters, modulation, analog-to-digital interfaces, DSP, memory, and transceivers that are coupled over bus circuitry. 5GNR BBU 502 comprises memory, CPU, and transceivers that are coupled over bus circuitry. The memory in BBU 502 stores operating systems and network applications like Physical Layer (PHY), Media Access Control (MAC), Radio Link Control (RLC), Packet Data Control Protocol (PDCP), Service Data Adaptation Protocol (SDAP), and Radio Resource Control (RRC). The CPU in 5GNR BBU 502 executes the operating systems, PHYs, MACs, RLCs, PDCPs, SDAPs, and RRCs to exchange: 5GNR signaling and user data with UE 410, 5GC signaling for UE 410 with AMF 433 in NFVI 430, and exchange 5GC data for UE 410 with UPF 436 in NFVI 430. UE 410 is wirelessly coupled to the antennas in 5GNR radio 501 over 5GNR links. A transceiver in 5GNR radio 501 is coupled to a transceiver in 5GNR BBU 502 over CPRI links. A transceiver in 5GNR BBU 502 is coupled to AMF 433 and UPF 436 over backhaul links.

In 5GNR radio 501, the antennas receive wireless 5GNR signals from UE 410 that transport UL 5GNR signaling and UL 5GNR data. The antennas transfer corresponding electrical UL signals through duplexers to the amplifiers. The amplifiers boost the received UL signals for filters which attenuate unwanted energy. Demodulators down-convert the UL signals from their carrier frequency. The analog/digital interfaces convert the analog UL signals into digital UL signals for the DSP. The DSP recovers UL 5GNR symbols from the UL digital signals. The CPUs execute the network applications to process the UL 5GNR symbols and recover the UL 5GNR signaling and the UL 5GNR data. The 5GNR RRC processes the UL 5GNR signaling and DL 5GC N2 signaling from AMF 433 to generate new UL 5GC N2 signaling and new DL 5GNR signaling. The 5GNR RRC transfers the new UL 5GC N2 signaling to AMF 433. The 5GNR SDAP transfers corresponding UL 5GC N3 data to UPF 436 over backhaul links.

In 5GNR BBU 502, the 5GNR RRC receives the 5GC DL N2 signaling from AMF 433. The 5GNR SDAP receives DL 5GNR N3 data from UPF 436. The 5GNR network applications process the new DL 5GNR signaling and the DL 5GNR data to generate corresponding DL 5GNR symbols that carry the DL 5GNR signaling and DL 5GNR data. In 5GNR radio 501, the DSP processes the DL 5GNR symbols to generate corresponding digital signals for the analog-to-digital interfaces. The analog-to-digital interfaces convert the digital DL signals into analog DL signals for modulation. Modulation up-converts the DL signals to their carrier frequency. The amplifiers boost the modulated DL signals for the filters which attenuate unwanted out-of-band energy. The filters transfer the filtered DL signals through duplexers to the antennas. The electrical DL signals drive the antennas to emit corresponding wireless 5GNR signals to UE 410 that transport the DL 5GNR signaling and DL 5GNR data.

RRC functions comprise authentication, security, handover control, status reporting, Quality-of-Service (QoS), network broadcasts and pages, and network selection. PDCP functions comprise security ciphering, header compression and decompression, sequence numbering and re-sequencing, de-duplication. RLC functions comprise Automatic Repeat Request (ARQ), sequence numbering and resequencing, segmentation and resegmentation. MAC functions comprise buffer status, power control, channel quality, Hybrid Automatic Repeat Request (HARQ), user identification, random access, user scheduling, and QoS. PHY functions comprise packet formation/deformation, windowing/de-windowing, guard-insertion/guard-deletion, parsing/de-parsing, control insertion/removal, interleaving/de-interleaving, Forward Error Correction (FEC) encoding/decoding, rate matching/de-matching, scrambling/descrambling, modulation mapping/de-mapping, channel estimation/equalization, Fast Fourier Transforms (FFTs)/Inverse FFTs (IFFTs), channel coding/decoding, layer mapping/de-mapping, precoding, Discrete Fourier Transforms (DFTs)/Inverse DFTs (IDFTs), and Resource Element (RE) mapping/de-mapping.

In operation, UE 410 wirelessly attaches to 5GNR BBU 502 over 5GNR radio 501. In response to the 5GNR attachment, 5GNR BBU 502 transfers 5GC N2 attachment signaling for UE 410 to AMF 433 in NFVI 430. 5GNR BBU 502 receives 5GC N2 signaling for UE 410 from AMF 433 that indicates network addressing, QoS, and the like. 5GNR BBU 502 transfers corresponding 5GNR signaling to UE 410 over 5GNR radio 501. 5GNR BBU 502 delivers the internet-access bearer and the SIP bearer to UE 410 responsive to the 5GC N2 signaling from AMF 433. UE 410 registers with IMS 431 over the SIP bearer.

5GNR BBU 502 receives 5GC N2 signaling for UE 410 from AMF 433 for a voice bearer over eNodeB 422. 5GNR BBU 502 transfers corresponding 5GNR signaling to UE 410 over 5GNR radio 501. UE 410 attaches to LTE eNodeB 422 for the voice-calling service responsive to this 5GNR RRC signaling.

Figure 6:
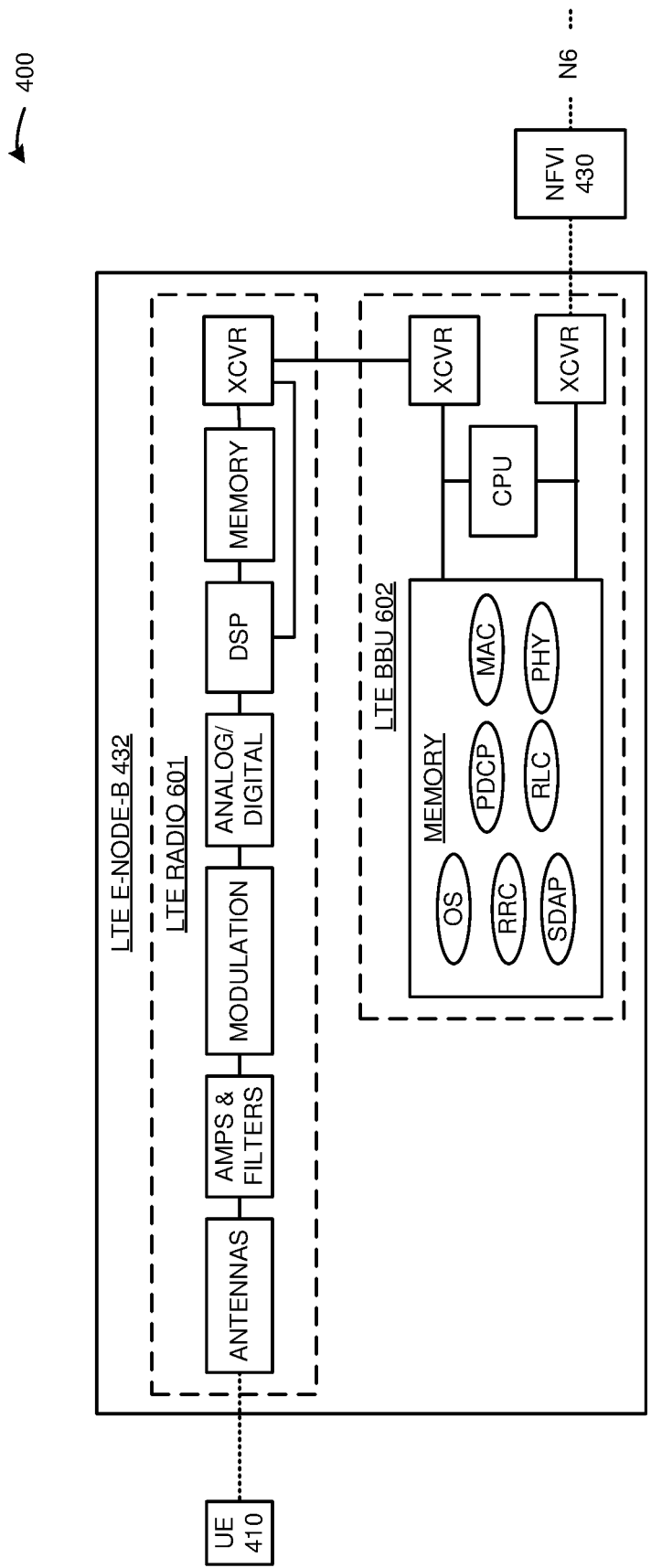
FIG. 6 illustrates a Long Term Evolution (LTE) eNodeB to serve the wireless UE with the wireless voice service.

FIG. 6 illustrates Long Term Evolution (LTE) eNodeB 422 to serve wireless UE 410 with the wireless voice-calling service. LTE eNodeB 422 is an example of eNodeB 121, although eNodeB 121 may differ. LTE eNodeB 422 comprises LTE radio 601 and LTE BBU 602. LTE radio 601 comprises antennas, amplifiers, filters, modulation, analog-to-digital interfaces, DSP, memory, and transceivers that are coupled over bus circuitry. LTE BBU 602 comprises memory, CPU, and transceivers that are coupled over bus circuitry. The memory in BBU 602 stores operating systems and network applications like PHY, MAC, RLC, PDCP, and RRC. The CPU in LTE BBU 602 executes the operating systems, PHYs, MACs, RLCs, PDCPs, and RRCs to exchange: LTE signaling and user data with UE 410, LTE signaling for UE 410 with MME 434 in NFVI 430, and exchange voice data for UE 410 with UPF 436 in NFVI 430. UE 410 is wirelessly coupled to the antennas in LTE radio 601 over an LTE link. A transceiver in LTE radio 601 is coupled to a transceiver in LTE BBU 602 over CPRI links. A transceiver in LTE BBU 602 is coupled to MME 434 and UPF 436 over backhaul links.

In LTE radio 601, the antennas receive wireless LTE signals from UE 410 that transport UL LTE signaling and UL voice data. The antennas transfer corresponding electrical UL signals through duplexers to the amplifiers. The amplifiers boost the received UL signals for filters which attenuate unwanted energy. Demodulators down-convert the UL signals from their carrier frequency. The analog/digital interfaces convert the analog UL signals into digital UL signals for the DSP. The DSP recovers UL LTE symbols from the UL digital signals. The CPUs execute the network applications to process the UL LTE symbols and recover the UL LTE signaling and the UL LTE data. The LTE RRC processes the UL LTE signaling and DL S1-MME signaling from MME 434 to generate new UL S1-MME signaling and new DL LTE signaling. The LTE RRC transfers the new UL LTE S1-MME signaling to MME 434. The LTE PDCP transfers corresponding UL voice data to UPF 436 over backhaul links.

In LTE BBU 602, the LTE RRC receives the DL S1-MME signaling from MME 434. The LTE PDCP receives DL voice data from UPF 436. The LTE network applications process the new DL LTE signaling and the DL voice data to generate corresponding DL LTE symbols that carry the DL LTE signaling and DL voice data. In LTE radio 601, the DSP processes the DL LTE symbols to generate corresponding digital signals for the analog-to-digital interfaces. The analog-to-digital interfaces convert the digital DL signals into analog DL signals for modulation. Modulation up-converts the DL signals to their carrier frequency. The amplifiers boost the modulated DL signals for the filters which attenuate unwanted out-of-band energy. The filters transfer the filtered DL signals through duplexers to the antennas. The electrical DL signals drive the antennas to emit corresponding wireless LTE signals to UE 410 that transport the DL LTE signaling and DL voice data.

RRC functions comprise authentication, security, handover control, status reporting, QoS, network broadcasts and pages, and network selection. PDCP functions comprise security ciphering, header compression and decompression, sequence numbering and re-sequencing, de-duplication. RLC functions comprise ARQ, sequence numbering and resequencing, segmentation and resegmentation. MAC functions comprise buffer status, power control, channel quality, HARQ, user identification, random access, user scheduling, and QoS. PHY functions comprise packet formation/deformation, windowing/de-windowing, guard-insertion/guard-deletion, parsing/de-parsing, control insertion/removal, interleaving/de-interleaving, FEC encoding/decoding, rate matching/de-matching, scrambling/descrambling, modulation mapping/de-mapping, channel estimation/equalization, FFTs/IFFTs, channel coding/decoding, layer mapping/de-mapping, precoding, DFTs/IDFTs, and RE mapping/de-mapping.

In operation, UE 410 wirelessly attaches to BBU 602 in LTE eNodeB 422 responsive to the 5GNR RRC signaling from 5GNR gNodeB 422. In response to the wireless attachment of UE 410, LTE eNodeB 422 transfers LTE S1-MME signaling for UE 410 to MME 434. LTE BBU 602 receives LTE S1-MME signaling for UE 410 from MME 434 and responsively delivers the voice bearer to UE 410 over LTE radio 601. Thus, voice data flows per a voice-quality GBR between UE 410 and NFVI 430 over LTE radio 601 and LTE BBU 602. In particular, the LTE MAC in BBU 602 schedules LTE resource blocks for UE 410 to achieve the GBR.

Figure 7:
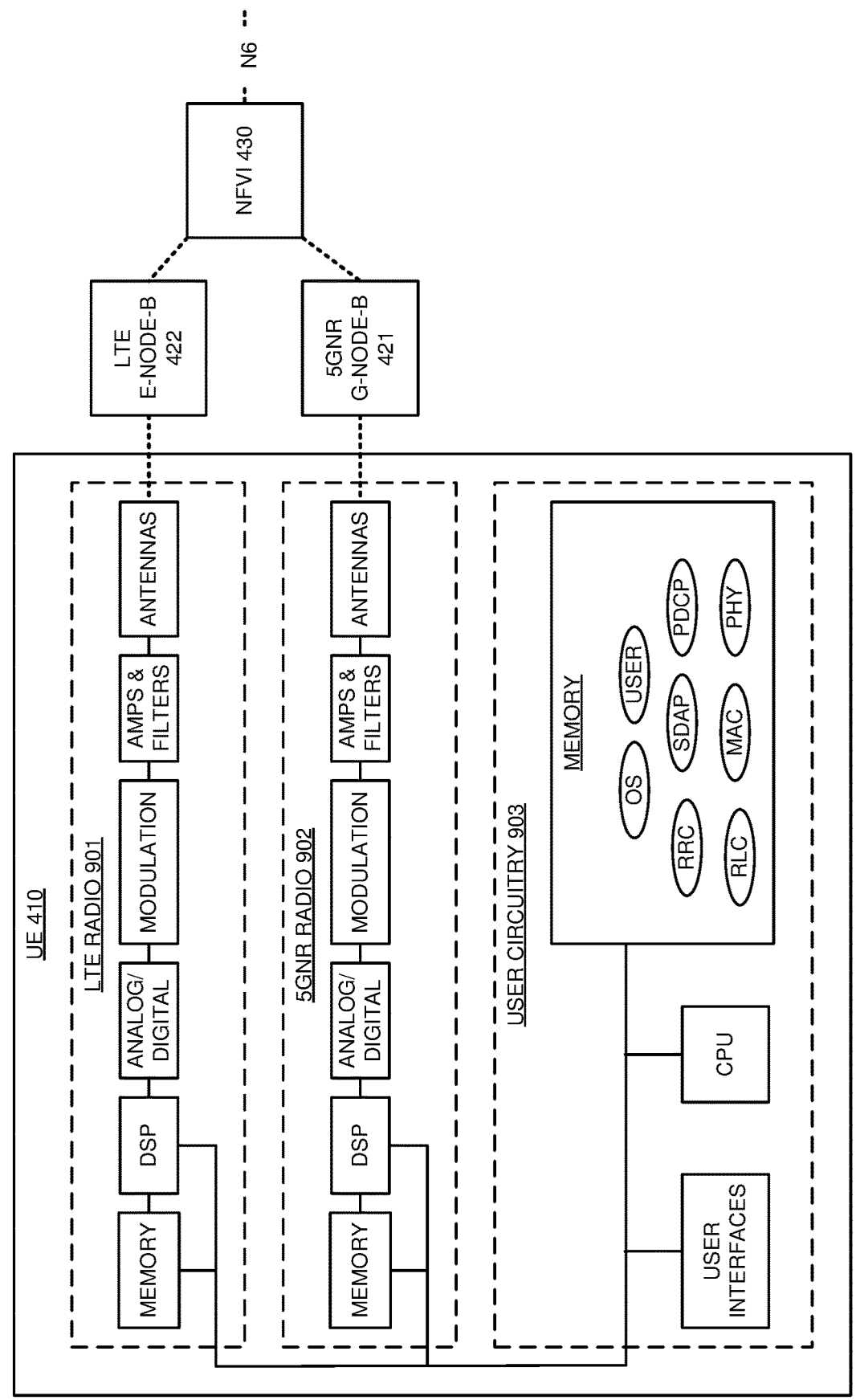
FIG. 7 illustrates the wireless UE that receives the wireless voice service.

FIG. 7 illustrates wireless UE 410 that receives the wireless voice service. UE 410 is an example of UE 110, although UE 110 may differ. UE 410 comprises LTE radio 901, 5GNR radio 902, and user circuitry 903 that are coupled over bus circuitry. Radios 901-902 comprise antennas, amplifiers, filters, modulation, analog-to-digital interfaces, DSP, and memory that are coupled over bus circuitry. User circuitry 903 comprises user interfaces, CPU, and memory that are coupled over bus circuitry. The antennas in radios 901-902 are wirelessly coupled to NodeBs 421-422. The user interfaces in user circuitry 903 comprise graphic displays, machine controllers, sensors, cameras, transceivers, and/or some other user components. The memory in user circuitry 903 stores an operating system, user voice calling application (USER), and network applications (PHY, MAC, RLC, PDCP, SDAP, and RRC). The CPU in user circuitry 903 executes the operating system and the user applications to generate and consume user data. The CPU in user circuitry 903 executes the operating system and the network applications to wirelessly exchange corresponding signaling and data with NodeBs 421-422 over radios 901-902.

In operation, the 5GNR RRC in UE 410 wirelessly attaches to gNodeB 421 over a wireless 5GNR link and the 5GNR PDCPs, RLCs, MACs, and PHYs. The 5GNR RRC receives 5GNR RRC signaling from gNodeB 421 over the wireless 5GNR link and the PDCPs, RLCs, MACs, and PHYs. The 5GNR RRC signaling indicates network addresses, QoS, and the like for the internet-access bearer and the SIP bearer. The user voice calling application registers UE 410 with IMS 431 over the SIP bearer. Other user applications access the internet over the internet-access bearer.

Eventually, the user voice calling application exchanges SIP signaling over the SIP bearer to initiate or accept a voice call. The 5GNR RRC receives 5GNR RRC signaling from 5GNR gNodeB 421 to attach to LTE eNodeB 422 for the voice call. The 5GNR RRC directs the LTE RRC to attach to LTE eNodeB 422 for the voice call. The LTE RRC wirelessly attaches to eNodeB 422 over a wireless LTE link and the LTE PDCPs, RLCs, MACs, and PHYs. The LTE RRC receives LTE RRC signaling from eNodeB 422 over the wireless LTE link and the PDCPs, RLCs, MACs, and PHYs. The LTE RRC signaling indicates network addresses, QoS, and the like for the voice bearer. The user voice calling application exchanges voice data over the voice bearer. Thus, voice data flows per a voice-quality GBR between UE 410 and the N6 links over LTE eNodeB 422 and NFVI 430.

Figure 8:
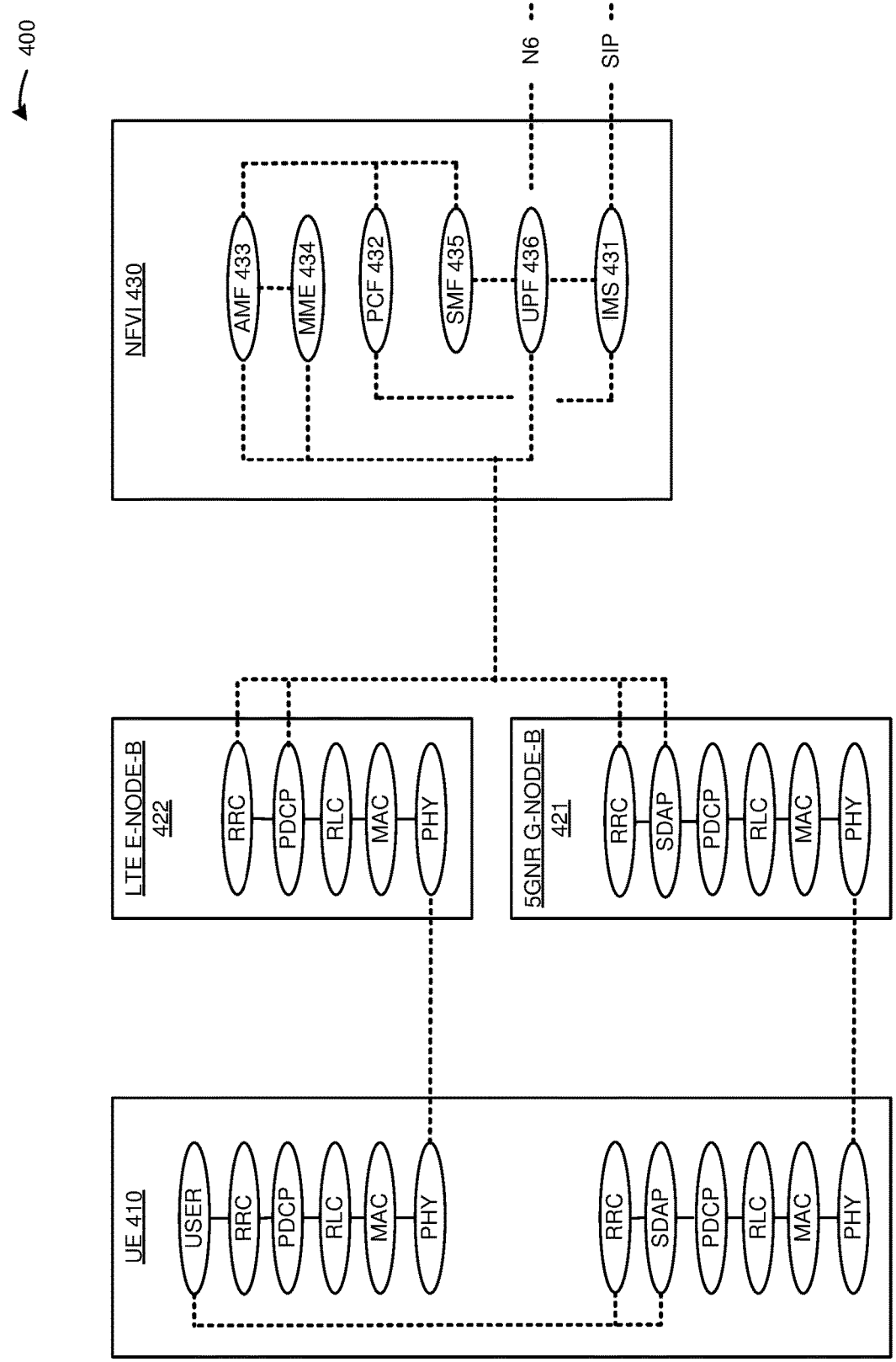
FIG. 8 illustrates an exemplary operation of a 5GNR/LTE network to serve the wireless UE with the wireless voice service.

FIG. 8 illustrates an exemplary operation of 5G/LTE network 400 to serve wireless UE 410 with the wireless voice service. 5G/LTE network 400 comprises an example of wireless communication network 100, although network 100 may differ. In operation, the 5GNR RRC in UE 410 wirelessly attaches to the RRC in 5GNR gNodeB 421 over their PDCPs, RLCs, MACs, and PHYs. In response to the 5GNR attachment, the RRC in 5GNR gNodeB 421 transfers 5GC N2 signaling for UE 410 to AMF 433 in NFVI 430. AMF 433 authenticates and authorizes UE 410 for 5GNR services that include internet-access and voice-calling. AMF 433 transfers 5GC SMF signaling to SMF 135 to implement the internet-access bearer and the SIP bearer. SMF 135 transfers 5GC N4 signaling to UPF 436 to implement the internet-access bearer and the SIP bearer. AMF 433 transfers 5GC N2 signaling to the 5GNR RRC in 5GNR gNodeB 421 to implement the internet-access bearer and the SIP bearer. The 5GNR RRC in 5GNR gNodeB 122 transfers 5GNR RRC signaling to the 5GNR RRC in UE 410 to implement the internet-access bearer and the SIP bearer. The 5GNR RRC in UE 410 receives the 5GNR RRC signaling that indicates network addresses, QoS, and the like for the internet-access bearer and the SIP bearer. The user voice calling application registers UE 410 with IMS 431 over the SIP bearer. Other user applications access the internet over the internet-access bearer.

In UE 410, the user voice calling application exchanges SIP signaling with IMS 431 over the SIP bearer to initiate or accept a voice call. IMS 431 exchanges SIP signaling with UE 410 over the SIP bearer and with an external node to initiate or accept the voice call. To serve the voice call, IMS 431 transfers a voice bearer request for UE 410 to PCF 432. PCF 432 receives the voice bearer request for UE 410 from IMS 431, and in response, transfers 5GC AMF signaling for UE 410 to AMF 433. AMF 133 receives the 5GC AMF signaling for UE 410 from PCF 432 and responsively determines if UE 410 qualifies for LTE fallback. When UE 410 qualifies for LTE fallback, then AMF 433 transfers: 1) 5GNR N2 signaling for UE 410 to 5GNR gNodeB 421, 2) 5GC PCF signaling for UE 410 to PCF 432, and 3) 5GC N26 signaling for UE 410 to MME 434. PCF 432 receives the PCF signaling from AMF 433 and responsively transfers SMF signaling for UE 410 to SMF 435. MME 434 receives the 5GC N26 signaling from AMF 433 and responsively transfers LTE S1-MME signaling for UE 410 to LTE eNodeB 422.

The RRC in 5GNR gNodeB 421 receives the 5GC N2 signaling from AMF 433 and responsively transfers 5GNR RRC signaling to the 5GNR RRC in UE 410 to attach to LTE eNodeB 422. The 5GNR RRC in UE 410 receives the 5GNR RRC signaling from 5GNR gNodeB 421. The 5GNR RRC directs the LTE RRC to attach to LTE eNodeB 422 for the voice call. The LTE RRC wirelessly attaches to the LTE RRC in eNodeB 422 over the LTE PDCPs, RLCs, MACs, and PHYs. In response to the wireless attachment of UE 410, the LTE RRC in LTE eNodeB 422 transfers LTE S1-MME signaling to MME 434. MME 434 receives the LTE S1-MME signaling from LTE eNodeB 422 and responsively transfers 5GC N26 signaling indicating the LTE attachment of UE 410 to AMF 433. AMF 133 receives the 5GC N26 signaling from MME 434 and responsively transfers SMF signaling for UE 410 to SMF 435. SMF 435 receives the SMF signaling from PCF 432 and from AMF 433. In response to both, SMF 435 transfers 5GC N4 signaling for UE 410 to UPF 436. UPF 436 receives the 5GC N4 signaling from SMF 435 and responsively delivers the voice bearer to UE 410. The LTE RRC in LTE eNodeB 422 receives the S1-MME signaling from MME 434 and responsively delivers the voice bearer to UE 410. The LTE RRC in UE 410 receives LTE RRC signaling from LTE eNodeB 422 over the LTE PDCPs, RLCs, MACs, and PHYs. The LTE RRC signaling indicates network addresses, QoS, and the like for the voice bearer. The user voice calling application exchanges voice data over the voice bearer. Thus, voice data flows per a GBR between UE 410 and the N6 links over LTE eNodeB 422 and UPF 436 in NFVI 430.

The wireless data network circuitry described above comprises computer hardware and software that form special-purpose network circuitry to serve wireless UEs with wireless GBR data services. The computer hardware comprises processing circuitry like CPUs, DSPs, GPUs, transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose network circuitry to serve wireless UEs with wireless GBR data services.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method of operating wireless communication network to serve a User Equipment (UE) with a wireless Guaranteed Bit Rate (GBR) service, the method comprising:
   a Policy Control Function (PCF) receiving a GBR service request for the UE and responsively transferring Fifth Generation Core (5GC) GBR signaling for the UE to an Access and Mobility Management Function (AMF);
   the AMF receiving the 5GC GBR signaling from the PCF, and in response, transferring Fifth Generation New Radio (5GNR) Radio Access Network (RAN) signaling for the UE to a gNodeB, transferring PCF fallback signaling for the UE to the PCF, and transferring Long Term Evolution (LTE) fallback signaling for the UE to a Mobility Management Entity (MME);
   the PCF receiving the PCF fallback signaling from the AMF and responsively transferring SMF GBR signaling for the UE to a Session Management Function (SMF);
   the MME receiving the LTE fallback signaling from the AMF and responsively transferring LTE RAN signaling for the UE to an eNodeB;
   the gNodeB receiving the 5GNR RAN signaling from the AMF and responsively transferring 5GNR UE signaling to the UE, wherein the UE attaches to an eNodeB responsive to the 5GNR UE signaling;
   the eNodeB wirelessly attaching the UE and responsively transferring LTE attachment signaling for the UE to the MME;
   the MME receiving the LTE attachment signaling from the eNodeB and responsively transferring GBR attachment signaling to the AMF;
   the AMF receiving the GBR attachment signaling from the MME and responsively transferring SMF fallback signaling for the UE to the SMF;
   the SMF receiving the SMF GBR signaling from the PCF and receiving the SMF fallback signaling from the AMF, and response to both, transferring gateway GBR signaling for the UE to a data gateway;
   the eNodeB receiving the LTE RAN signaling from the MME and responsively delivering the wireless GBR service to the UE; and the data gateway receiving the gateway GBR signaling from the SMF and responsively delivering the wireless GBR service to the UE over the eNodeB.

2. The method of claim 1 wherein the AMF transferring the 5GNR RAN signaling, the PCF fallback signaling, and the LTE fallback signaling comprises:
   determining that the UE is designated for LTE GBR fallback responsive to the 5GC GBR signaling; and
   transferring the 5GNR RAN signaling, the PCF fallback signaling, and the LTE fallback signaling in response to the determination that the UE is designated for the LTE GBR fallback.

3. The method of claim 1 wherein the AMF transferring the 5GNR RAN signaling, the PCF fallback signaling, and the LTE fallback signaling comprises:
   determining that the UE is not designated for Voice over New Radio (VoNR) responsive to the 5GC GBR signaling; and
   transferring the 5GNR RAN signaling, the PCF fallback signaling, and the LTE fallback signaling in response to the determination that the UE is not designated for the VoNR.

4. The method of claim 1 further comprising the gNodeB serving the UE with a wireless non-GBR service before the PCF receives the GBR request for the UE.

5. The method of claim 1 wherein the PCF receiving the GBR service request for the UE comprises receiving the GBR service request from an Internet Protocol Multimedia Subsystem (IMS).

6. The method of claim 1 wherein the PCF receiving the GBR service request for the UE comprises receiving the GBR service request from a Proxy Call State Control Function (P-CSCF).

7. The method of claim 1 wherein:
   the SMF comprises a System Architecture Evolution Gateway Control Plane (SAE GW-C); and
   the data gateway comprises System Architecture Evolution Gateway User Plane (SAE GW-U).

8. The method of claim 1 wherein the wireless GBR service comprise a voice-calling service.

9. The method of claim 1 wherein the wireless GBR service comprise a video-calling service.

10. The method of claim 1 wherein the wireless GBR service comprise an interactive gaming service.

11. A wireless communication network to serve a User Equipment (UE) with a wireless Guaranteed Bit Rate (GBR) service, the wireless communication network comprising:
   a Policy Control Function (PCF) configured to receive a GBR service request for the UE and responsively transfer Fifth Generation Core (5GC) GBR signaling for the UE to an Access and Mobility Management Function (AMF);
   the AMF configured to receive the 5GC GBR signaling from the PCF, and in response, transfer Fifth Generation New Radio (5GNR) Radio Access Network (RAN) signaling for the UE to a gNodeB, transfer PCF fallback signaling for the UE to the PCF, and transfer Long Term Evolution (LTE) fallback signaling for the UE to a Mobility Management Entity (MME);
   the PCF configured to receive the PCF fallback signaling from the AMF and responsively transfer SMF GBR signaling for the UE to a Session Management Function (SMF);
   the MME configured to receive the LTE fallback signaling from the AMF and responsively transfer LTE RAN signaling for the UE to an eNodeB;
   the gNodeB configured to receive the 5GNR RAN signaling from the AMF and responsively transfer 5GNR UE signaling to the UE, wherein the UE attaches to an eNodeB responsive to the 5GNR UE signaling;
   the eNodeB configured to wirelessly attach the UE and responsively transferring LTE attachment signaling for the UE to the MME;
   the MME configured to receive the LTE attachment signaling from the eNodeB and responsively transfer GBR attachment signaling to the AMF;
   the AMF configured to receive the GBR attachment signaling from the MME and responsively transfer SMF fallback signaling for the UE to the SMF;
   the SMF configured to receive the SMF GBR signaling from the PCF and receive the SMF fallback signaling from the AMF, and response to both, transfer gateway GBR signaling for the UE to a data gateway;
   the eNodeB configured to receive the LTE RAN signaling from the MME and responsively deliver the wireless GBR service to the UE; and
   the data gateway configured to receive the gateway GBR signaling from the SMF and responsively deliver the wireless GBR service to the UE over the eNodeB.

12. The wireless communication network of claim 11 wherein the AMF is configured to determine that the UE is designated for LTE GBR fallback responsive to the 5GC GBR signaling and transfer the 5GNR RAN signaling, the PCF fallback signaling, and the LTE fallback signaling in response to the determination that the UE is designated for the LTE GBR fallback.

13. The wireless communication network of claim 11 wherein the AMF is configured to determine that the UE is not designated for Voice over New Radio (VoNR) responsive to the 5GC GBR signaling and transfer the 5GNR RAN signaling, the PCF fallback signaling, and the LTE fallback signaling in response to the determination that the UE is not designated for the VoNR.

14. The wireless communication network of claim 11 further comprising the gNodeB configured to serve the UE with a wireless non-GBR service before the PCF receives the GBR request for the UE.

15. The wireless communication network of claim 11 wherein the PCF is configured to receive the GBR service request for the UE from an Internet Protocol Multimedia Subsystem (IMS).

16. The wireless communication network of claim 11 wherein the PCF is configured to receive the GBR service request for the UE from a Proxy Call State Control Function (P-CSCF).

17. The wireless communication network of claim 11 wherein:
   the SMF comprises a System Architecture Evolution Gateway Control Plane (SAE GW-C); and
   the data gateway comprises System Architecture Evolution Gateway User Plane (SAE GW-U).

18. The wireless communication network of claim 11 wherein the wireless GBR service comprise a voice-calling service.

19. The wireless communication network of claim 11 wherein the wireless GBR service comprise a video-calling service.

20. The wireless communication network of claim 11 wherein the wireless GBR service comprise an interactive gaming service.

* * * * *